United States Patent Office 3,544,824
Patented Dec. 1, 1970

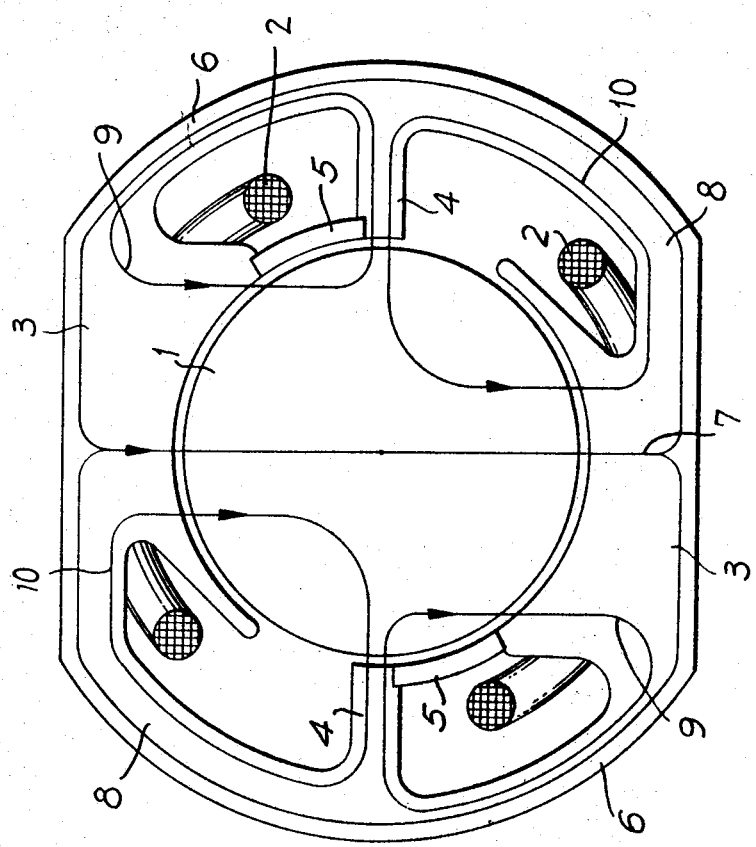

---

3,544,824
SINGLE-PHASE MINIATURE SALIENT POLE ASYNCHRONOUS MOTOR
Pavel Ivanovich Kostrauskas, Ulitsa Ju. Gagarina 18, kv. 1; Rimantas-Ionas Domininkovich Mukulis, Ulitsa Kaishyadorju 37; and Teodoras Teodorovich Shimkevichjus, allea Biduno 25, kv. 318, all of Kaunas, U.S.S.R.
Filed Feb. 21, 1968, Ser. No. 707,149
Int. Cl. H02k 1/14
U.S. Cl. 310—185                         2 Claims

ABSTRACT OF THE DISCLOSURE

A single phase asynchronous motor wherein the stator has narrow poles without field windings alternating with wide poles provided with field windings. Shunts connect the poles in pairs and the yoke portions associated with the connected poles have cross-sectional areas which are smaller than the yoke portions associated with the unconnected poles.

---

The present invention relates to single-phase salient-pole asynchronous motors of the type having an asymmetrical magnetic circuit in the stator and devoid of any starting coil.

Known in the art is a miniature single-phase asynchronous motor wherein the starting torque is developed due to the effect of various losses occurring in stator yokes of different cross-sectional area following each other in succession. Commutating poles in a number equal to that of the main poles and of a shape similar to that of the latter are provided on the stator in order to establish paths for magnetic fluxes having phases differing from that of the main flux. Ferromagnetic shunts inserted between the tips of the main and commutating poles opposite the stator yoke of reduced cross-sectional area are employed for increasing the angular displacement between corresponding magnetic fluxes.

An inherent disadvantage of the above-mentioned miniature motor lies in the fact that a strongly pronounced third spatial harmonic is present in the gap flux density curve. The presence of this harmonic affects the mechanical characteristics and, consequently, the power and technical characteristics of the machine since the pole arc of these miniature motors is much less than a half of the pole pitch.

A primary object of the herein proposed invention is the elimination of said disadvantages.

A further object of the invention is to provide a single-phase miniature asynchronous motor having improved mechanical characteristics, of higher efficiency and with better power and performance characteristics.

These objects are attained by the development of single-phase miniature asynchronous motor, wherein the stator poles are of different width, the narrow poles without a field winding alternating with wide poles provided with a field winding.

The present invention will further be described by way of example with reference to the accompanying drawing wherein the sole figure is a plan view of a single-phase miniature asynchronous salient pole motor according to a preferred embodiment of the invention.

It can be seen in the drawing that the herein-proposed miniature electric motor has a conventional squirrel-cage rotor 1 and a salient-pole stator fitted with field coil 2. The shape of the stator main poles 3 is the same as in all single-phase miniature asynchronous salient pole motors of conventional design and is made so as to lessen the higher spatial magnetic induction harmonics in the air gap. Auxiliary poles 4 establish the required permeance along the transverse axis of the miniature motor, thus insuring an adequate locked-rotor torque as well as an improvement of power characteristics.

The ratio of the width of auxiliary poles 4 to the width of main poles 3 is to be within a range of from 0.025 to 0.85.

Ferromagnetic shunts 5 allow increase of the magnetic saturation of yoke 6 of a reduced cross-sectional area and, also, to increase the permeance along the transverse axis of the miniature motor. The main magnetic flux 7 passes through the magnetic circuit of the machine, wherein yoke 6 of a reduced cross-sectional area and yoke 8 of an increased cross-sectional area are connected in series. As a result, the phase of main magnetic flux 7 lags behind that of magnetic flux 9 which flows through saturated yoke 6 and is in advance of the phase of magnetic flux 10 which flows through non-saturated yoke 8. Since the above-mentioned magnetic fluxes 7, 9 and 10 are in different phases and at angles differing from zero inside the air gap of the machine, a rotating elliptic field that develops a locked-rotor torque is set up in the air gap. The magnitudes of the phases and moduli of magnetic fluxes 7, 9 and 10 depend upon the ratio of the pole arc lengths of main poles 3 and auxiliary poles 4, the ratio of the cross-sectional areas of stator yokes 6 and 8 and, likewise, upon the shape and material of ferromagnetic shunts 5. The cross-sectional area of the yokes are selected so that the magnetic density of the fluxes passing through the yokes is greater than that at which a maximum value of the loss angle of the stator yoke steel is insured.

Bearing this in mind and depending on the field of application of the miniature motor in question, the factors affecting the starting torque may be varied within broad limits.

The above-described miniature motor can be used in drives operating under light starting conditions (ventilating fans, record players, washing machines, etc.), i.e. they can be used instead of single-phase miniature shaded-pole asynchronous motors used generally for these purposes. This promotes an economical gain, since the utilization of active materials in the induction motor disclosed is from 1.5 to 2.0 times greater and the efficiency is from 1.2 to 1.8 times higher than in the case of shaded-pole miniature motors.

What we claim is:

1. A single phase miniature salient-pole asynchronous motor comprising a rotor, and a stator surrounding said rotor, said stator including a yoke with alternating main and auxiliary poles around said rotor, said main poles having faces with greater width than the auxiliary poles to provide an asymmetrical stator magnetic circuit, field windings on said main poles only, and ferromagnetic shunts coupling said main and auxiliary poles, said yoke having a cross-sectional area between poles which alternately is reduced and increased respectively to form successive saturated and unsaturated portions in the yoke, said auxiliary poles carrying only flux generated by the action of the field windings on the main poles.

2. A motor as claimed in claim 1 wherein the width of the faces of the auxiliary poles is between 0.025 and 0.85 of the width of the faces of main poles.

References Cited

UNITED STATES PATENTS

| | | | |
|---|---|---|---|
| 1,774,304 | 8/1930 | Turbayne | 310—190 |
| 2,080,388 | 5/1937 | Langkau | 310—190 |
| 2,482,526 | 9/1949 | Watson | 310—190 |
| 2,761,082 | 8/1956 | Chang | 310—166 |
| 2,907,904 | 10/1959 | Carpenter | 310—166 |
| 3,274,412 | 9/1966 | Fisher | 310—186 |

WARREN E. RAY, Primary Examiner
R. SKUDY, Assistant Examiner

U.S. Cl. X.R.
310—190